US012720407B2

(12) United States Patent
Sampathkumar

(10) Patent No.: US 12,720,407 B2
(45) Date of Patent: Aug. 25, 2026

(54) COMPUTERIZED SYSTEMS AND METHODS FOR LOSSLESS MESH NETWORK TOPOLOGY CHANGE USING MULTI-LINK OPERATION

(71) Applicant: PLUME DESIGN, INC., Palo Alto, CA (US)

(72) Inventor: Badri Srinivasan Sampathkumar, Fremont, CA (US)

(73) Assignee: PLUME DESIGN, INC., Palo Alto, CA (US)

( * ) Notice: Subject to any disclaimer, the term of this patent is extended or adjusted under 35 U.S.C. 154(b) by 366 days.

(21) Appl. No.: 18/346,980

(22) Filed: Jul. 5, 2023

(65) Prior Publication Data

US 2025/0016657 A1 Jan. 9, 2025

(51) Int. Cl.

*H04W 76/10* (2018.01)
*H04W 40/24* (2009.01)
*H04W 76/30* (2018.01)
*H04W 84/12* (2009.01)

(52) U.S. Cl.

CPC ......... *H04W 40/248* (2013.01); *H04W 76/10* (2018.02); *H04W 76/30* (2018.02); *H04W 84/12* (2013.01)

(58) Field of Classification Search

None

See application file for complete search history.

(56) References Cited

U.S. PATENT DOCUMENTS 12,082,242 B2 * 9/2024 Jang .................. H04W 74/0808
2007/0189191 A1 8/2007 Ades
2014/0038591 A1 2/2014 Pratt, Jr. et al.
2020/0184788 A1 6/2020 Emmanuel et al.
2021/0409979 A1 12/2021 Liu et al.
2022/0039180 A1 2/2022 Mukherjee et al.
2022/0394759 A1 * 12/2022 Jang ...................... H04W 74/04
2023/0180019 A1 * 6/2023 Martin .................. H04W 16/18 455/446
2023/0337265 A1 * 10/2023 Shafin ................... H04W 76/15
2024/0196457 A1 * 6/2024 Asterjadhi ...... H04W 36/00692
2024/0334514 A1 * 10/2024 Wakudkar ............. H04W 76/15
2024/0357680 A1 * 10/2024 Lee ....................... H04L 5/0053
2024/0381162 A1 * 11/2024 Manoharan ....... H04W 28/0263
2025/0056614 A1 * 2/2025 Quan ...................... H04W 8/22

OTHER PUBLICATIONS

International Search Report and Written Opinion to corresponding Int'l Appln. No. PCT/US24/36537, mailed Oct. 16, 2024, 12 pages.

* cited by examiner

*Primary Examiner* — Kodzovi Acolatse
(74) *Attorney, Agent, or Firm* — Nicholas Martin; Greenberg Traurig, LLP

(57) ABSTRACT

Disclosed are systems and methods that provide a computerized network management framework that adaptively configures a network according to mesh network topologies. The disclosed framework enables the implementation of multi-link operation (MLO) functionality with WiFi 7 enabled mesh networks. The disclosed network management framework operates by enabling mesh network topology changes, via MLO, to ensure that network disruptions are eliminated so as to enable continued best in class network connectivity through a network topology change.

19 Claims, 9 Drawing Sheets

COMPUTERIZED SYSTEMS AND METHODS FOR LOSSLESS MESH NETWORK TOPOLOGY CHANGE USING MULTI-LINK OPERATION

FIELD OF THE DISCLOSURE

The present disclosure is generally related to management of a network, and more particularly, to a decision intelligence (DI)-based computerized framework for deterministically managing, controlling and/or configuring multi-link operation (MLO) functionality of a mesh network at a location.

BACKGROUND

WiFi 7, also referred to as IEEE 802.11be, is the latest generation of wireless technology.

SUMMARY OF THE DISCLOSURE

WiFi 7 is designed to provide faster speeds, lower latency and increased capacity compared to previous WiFi standards. Among other benefits, WiFi 7 can provide extreme high throughput (EHT), and can support multi-access point (AP) coordination (e.g., coordination and joint transmission.

WiFi 7 includes functionality to bond WiFi links across multiple radios/frequency bands together into a single multi-link device, which provides the ability to transmit packets destined for that endpoint via either of the constituent links. This ability translates to improved throughput performance and capacity since such metrics can now become additive amongst the constituent links. For example, WiFi 7 provides improved latency in traffic flows due to the ability to send traffic over the less congested link.

WiFi 7 MLO features provide redundancy in terms of providing the ability to have multiple Median Access Control (MAC) Link layer connections between an access point (AP) and a client device (referred to as a client or user device, or user equipment (UE), interchangeably). Such connections can be realized for both front haul and back haul connections of a WiFi Mesh network.

To that end, according to some embodiments, as discussed herein, the disclosed systems and methods provide a novel computerized network framework that can leverage such redundancy to effect mesh topology changes in a lossless manner. That is, the framework can cause, control and/or manage mesh network topology changes without causing a disruption to connectivity between the APs in the back haul and between APs and clients in the front haul.

Currently, without MLO, any changes to a mesh topology incurs a disruption in the data path and connectivity because there can be changes in parent-child relationship between Access Points in the Mesh network, changes to the frequency band/radio in which the back haul/front haul connections are made, and/or changes in channels within a radio frequency band for the back haul/front haul connections. Indeed, any combination of the above can occur in a typical mesh topology change, which can result in disruption of connectivity.

Accordingly, as discussed herein, the disclosed framework can operate to mitigate such shortcomings, among others, via the implementation of MLO. That is, since MLO provides the ability to have two (2) link layer connections, a mesh topology parent-child connection can always have a 2.4 GHz radio connection established as part of a MLO connection in the back haul (e.g., when the APs are WiFi 7 compliant), and front-haul for the clients that are WiFi 7 compliant. Thus, in some embodiments, the 2.4 GHz link can remain in a dormant state by not using it to transfer any packets. However, whenever there is a mesh topology change requires a change to the radios other than the 2.4 GHz band (5 GHZ/6 GHz radios in this example case), the framework can function to activate the dormant 2.4 GHz link to pass data while the framework breaks the connection on the 5 GHZ/6 GHZ radio and established the new connection. As such, once the new connection is completed (e.g., after the connection is secure and established and/or after a predetermined period of time (e.g., 1 minute or 10 minutes, dependent upon jurisdiction), the framework can disconnect the old MLO connection.

According to some embodiments, it should be understood that the mention of a 2.4 GHZ radio link that is part of the MLO connection in the above example, to be used as a back-up connectivity path when the other radios are reconfigured/changed is a non-limiting embodiment, and one of ordinary skill art would be able to understand that any radio (5 GHZ, 6 GHZ, and the like), whether known or to be known, can be used as the back-up connectivity link while the other radios are being reconfigured.

It should be understood that while the discussion herein will focus on WiFi 7 and mesh networks at a location, it should not be construed as limiting, as any type of known or to be known type of network for which MLO functionality can be implemented can be utilized via the disclosed systems and methods without departing from the scope of the instant disclosure.

According to some embodiments, a method is disclosed for a lossless mesh network topology via executed MLO functionality. In accordance with some embodiments, the present disclosure provides a non-transitory computer-readable storage medium for carrying out the above-mentioned technical steps of the framework's functionality. The non-transitory computer-readable storage medium has tangibly stored thereon, or tangibly encoded thereon, computer readable instructions that when executed by a device cause at least one processor to perform a method for a lossless mesh network topology via executed MLO functionality.

In accordance with one or more embodiments, a system is provided that includes one or more processors and/or computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

DESCRIPTIONS OF THE DRAWINGS

The features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

DETAILED DESCRIPTION

Figure 1:
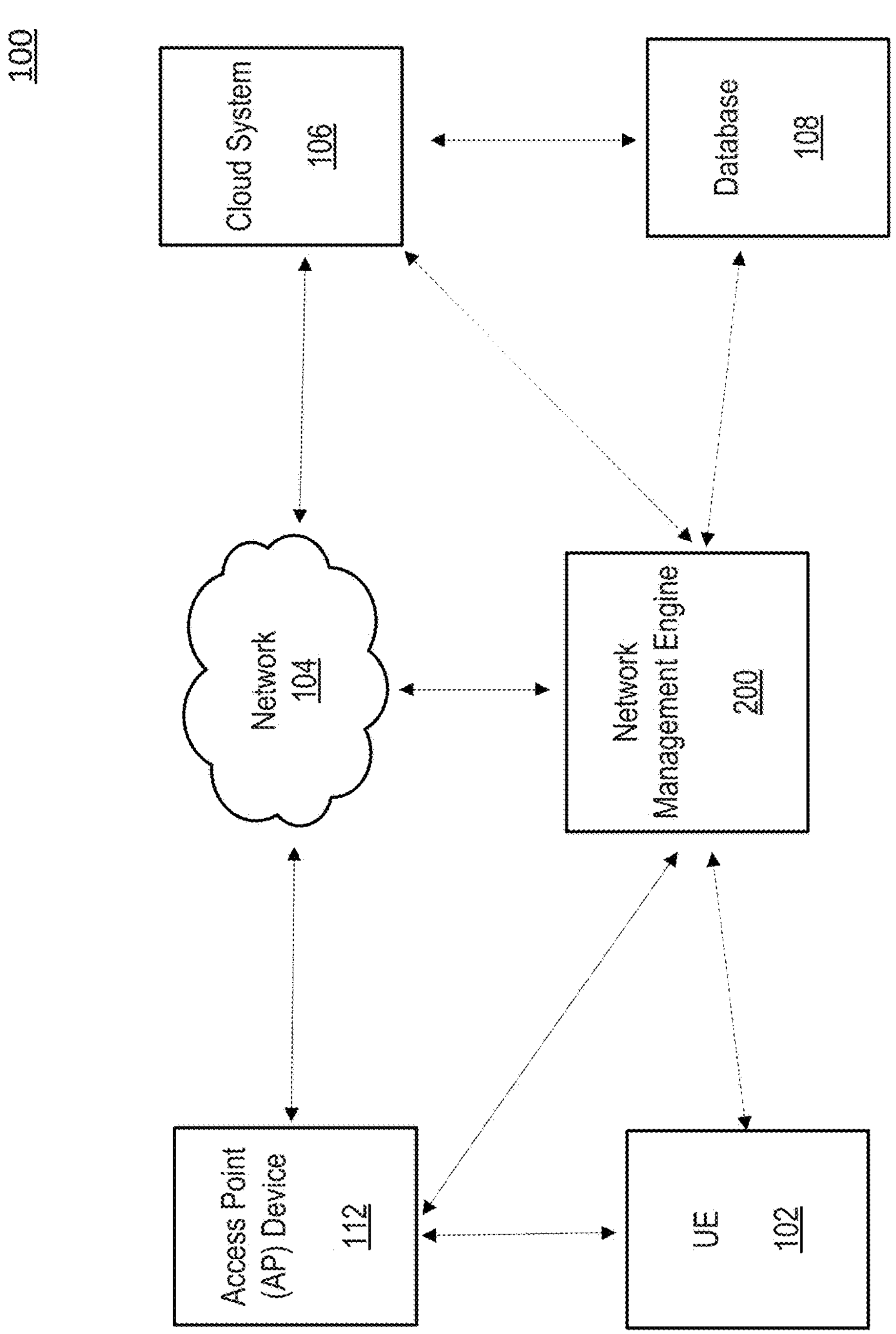
FIG. 1 is a block diagram of an example configuration within which the systems and methods disclosed herein could be implemented according to some embodiments of the present disclosure.

The present disclosure will now be described more fully hereinafter with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or." as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure a non-transitory computer readable medium (or computer-readable storage medium/media) stores computer data, which data can include computer program code (or computer-executable instructions) that is executable by a computer, in machine readable form. By way of example, and not limitation, a computer readable medium may include computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage, cloud storage, magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), a content delivery network (CDN) or other forms of computer or machine-readable media, for example. A network may include the Internet, one or more local area networks (LANs), one or more wide area networks (WANs), wire-line type connections, wireless type connections, cellular or any combination thereof. Likewise, sub-networks, which may employ different architectures or may be compliant or compatible with different protocols, may interoperate within a larger network.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further employ a plurality of network access technologies, including Wi-Fi, Long Term Evolution (LTE), WLAN, Wireless Router mesh, or 2nd, 3rd, $4^{th}$ or $5^{th}$ generation (2G, 3G, 4G or 5G) cellular technology, mobile edge computing (MEC), Bluetooth, 802.11b/g/n, or the like. Network access technologies may enable wide area coverage for devices, such as client devices with varying degrees of mobility, for example.

In short, a wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For purposes of this disclosure, a client (or user, entity, subscriber or customer) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device a Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations, such as a web-enabled client device or previously mentioned devices may include a high-resolution screen (HD or 4K for example), one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

Certain embodiments and principles will be discussed in more detail with reference to the figures. With reference to FIG. 1, system 100 is depicted which includes UE 102 (e.g., a client device, as mentioned above and discussed below in relation to FIG. 8), access point (AP) device 112, network 104, cloud system 106, database 108 and network management engine 200. It should be understood that while system 100 is depicted as including such components, it should not be construed as limiting, as one of ordinary skill in the art would readily understand that varying numbers of UEs, AP devices, peripheral devices, sensors, cloud systems, databases and networks can be utilized; however, for purposes of explanation, system 100 is discussed in relation to the example depiction in FIG. 1.

According to some embodiments, UE 102 can be any type of device, such as, but not limited to, a mobile phone, tablet, laptop, sensor, IoT device, wearable device, autonomous machine, and any other device equipped with a cellular or wireless or wired transceiver.

In some embodiments, peripheral devices (not shown) can be connected to UE 102, and can be any type of peripheral device, such as, but not limited to, a wearable device (e.g., smart watch), printer, speaker, sensor, and the like. In some embodiments, a peripheral device can be any type of device that is connectable to UE 102 via any type of known or to be known pairing mechanism, including, but not limited to, WiFi, Bluetooth™, Bluetooth Low Energy (BLE), NFC, and the like.

According to some embodiments, AP device 112 is a device that creates and/or provides a wireless local area network (WLAN) for the location. According to some embodiments, the AP device 112 can be, but is not limited to, a router, switch, hub, gateway, extender and/or any other type of network hardware that can project a WiFi signal to a designated area. In some embodiments, UE 102 may be an AP device.

In some embodiments, network 104 can be any type of network, such as, but not limited to, a wireless network, cellular network, the Internet, and the like (as discussed above). Network 104 facilitates connectivity of the components of system 100, as illustrated in FIG. 1.

According to some embodiments, cloud system 106 may be any type of cloud operating platform and/or network based system upon which applications, operations, and/or other forms of network resources may be located. For example, system 106 may be a service provider and/or network provider from where services and/or applications may be accessed, sourced or executed from. For example, system 106 can represent the cloud-based architecture associated with a smart home or network provider, which has associated network resources hosted on the internet or private network (e.g., network 104), which enables (via engine 200) the energy management discussed herein.

In some embodiments, cloud system 106 may include a server(s) and/or a database of information which is accessible over network 104. In some embodiments, a database 108 of cloud system 106 may store a dataset of data and metadata associated with local and/or network information related to a user(s) of the components of system 100 and/or each of the components of system 100 (e.g., UE 102, AP device 112, and the services and applications provided by cloud system 106 and/or network management engine 200).

In some embodiments, for example, cloud system 106 can provide a private/proprietary management platform, whereby engine 200, discussed infra, corresponds to the novel functionality system 106 enables, hosts and provides to a network 104 and other devices/platforms operating thereon.

Figure 6:
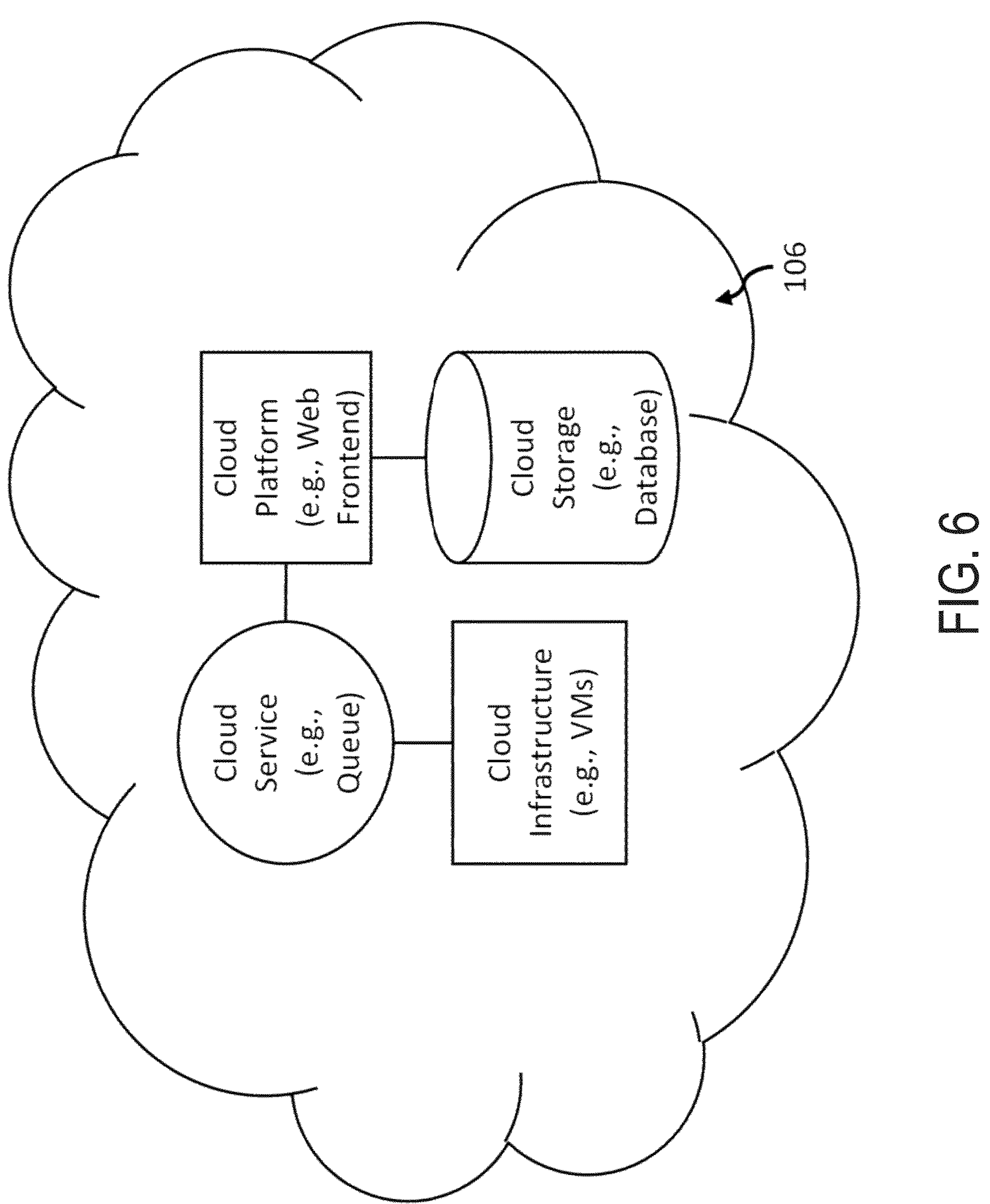
FIG. 6 depicts an exemplary implementation of an architecture according to some embodiments of the present disclosure.
Figure 7:
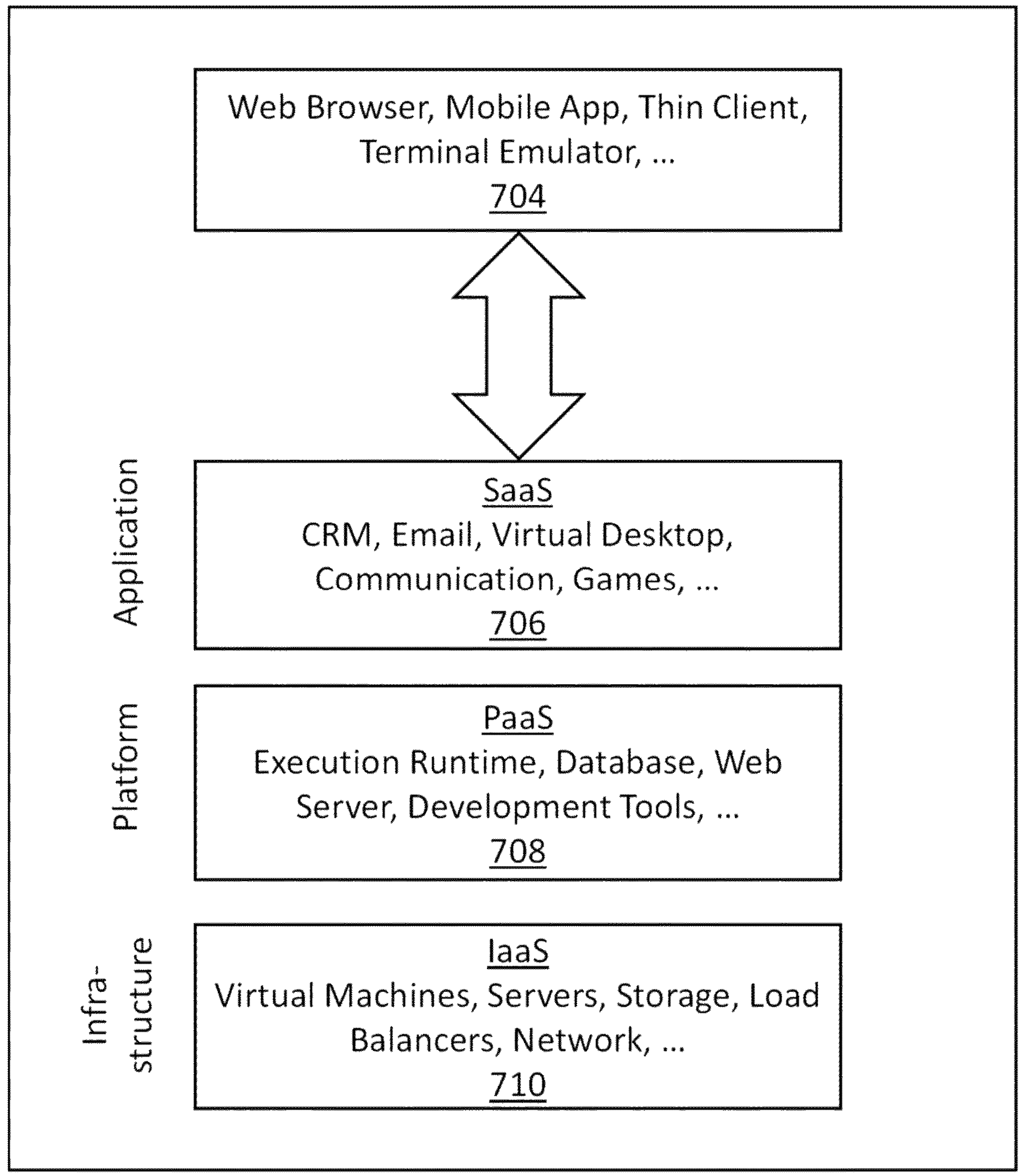
FIG. 7 depicts an exemplary implementation of an architecture according to some embodiments of the present disclosure.

Turning to FIGS. 6 and 7, in some embodiments, the exemplary computer-based systems/platforms, the exemplary computer-based devices, and/or the exemplary computer-based components of the present disclosure may be specifically configured to operate in a cloud computing/architecture 106 such as, but not limiting to: infrastructure as a service (IaaS) 710, platform as a service (PaaS) 708, and/or software as a service (SaaS) 706 using a web browser, mobile app, thin client, terminal emulator or other endpoint 704. FIGS. 6 and 7 illustrate schematics of non-limiting implementations of the cloud computing/architecture(s) in which the exemplary computer-based systems for administrative customizations and control of network-hosted application program interfaces (APIs) of the present disclosure may be specifically configured to operate.

Turning back to FIG. 1, according to some embodiments, database 108 may correspond to a data storage for a platform (e.g., a network hosted platform, such as cloud system 106, as discussed supra) or a plurality of platforms. Database 108 may receive storage instructions/requests from, for example, engine 200 (and associated microservices), which may be in any type of known or to be known format, such as, for example, standard query language (SQL). According to some embodiments, database 108 may correspond to any type of known or to be known storage, for example, a memory or memory stack of a device, a distributed ledger of a distributed network (e.g., blockchain, for example), a look-up table (LUT), and/or any other type of secure data repository.

Network management engine 200, as discussed above and further below in more detail, can include components for the disclosed functionality. According to some embodiments, network management engine 200 may be a special purpose machine or processor, and can be hosted by a device on network 104, within cloud system 106, on AP device 112 and/or on UE 102. In some embodiments, engine 200 may be hosted by a server and/or set of servers associated with cloud system 106.

According to some embodiments, as discussed in more detail below, network management engine 200 may be configured to implement and/or control a plurality of services and/or microservices, where each of the plurality of services/microservices are configured to execute a plurality of workflows associated with performing the disclosed network management. Non-limiting embodiments of such workflows are provided below in relation to at least FIGS. 3-5.

According to some embodiments, as discussed above, network management engine 200 may function as an application provided by cloud system 106. In some embodiments, engine 200 may function as an application installed on a server(s), network location and/or other type of network resource associated with system 106. In some embodiments, engine 200 may function as an application installed and/or executing on AP device 112 and/or UE 102. In some embodiments, such application may be a web-based application accessed by AP device 112, UE 102 and/or devices over network 104 from cloud system 106. In some embodiments, engine 200 may be configured and/or installed as an augmenting script, program or application (e.g., a plug-in or extension) to another application or program provided by cloud system 106 and/or executing on AP device 112 and/or UE 102.

Figure 2:
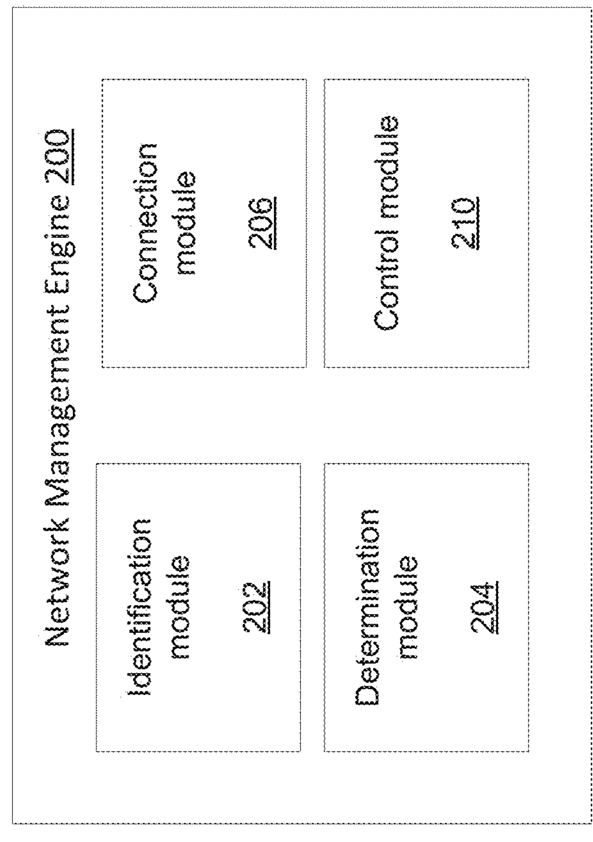
FIG. 2 is a block diagram illustrating components of an exemplary system according to some embodiments of the present disclosure.

As illustrated in FIG. 2, according to some embodiments, network management engine 200 includes collection module 202, determination module 204, connection module 206 and control module 208. It should be understood that the engine(s) and modules discussed herein are non-exhaustive, as additional or fewer engines and/or modules (or sub-modules) may be applicable to the embodiments of the systems and methods discussed. More detail of the operations, configurations and functionalities of engine 200 and each of its modules, and their role within embodiments of the present disclosure will be discussed below.

Figure 3:
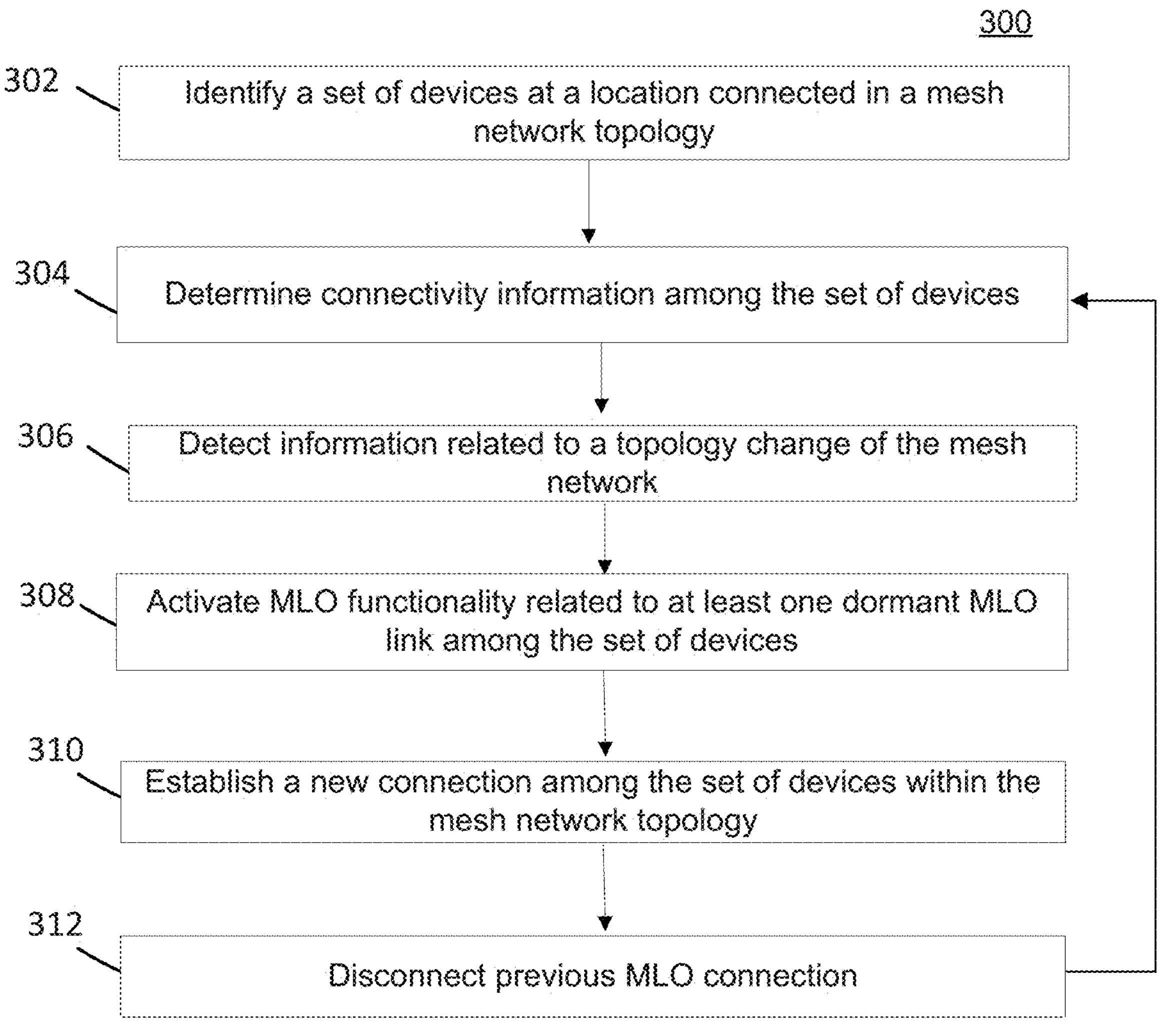
FIG. 3 illustrates an exemplary workflow according to some embodiments of the present disclosure.

Turning to FIG. 3, Process 300 provides non-limiting example embodiments for the disclosed network management framework. According to some embodiments, Process 300 provides the executable steps for managing, updating and configuring a computerized mesh topology via MLO functionality.

According to some embodiments, Step 302 of Process 300 can be performed by identification module 202 of network management engine 200; Steps 304-36 can be performed by determination module 204; Steps 308 and 310 can be performed by connection module 206; and Step 312 can be performed by control module 312.

According to some embodiments, Process 300 begins with Step 302 where engine 200 can identify a set devices associated with a location. According to some embodiments, the set of devices identified can correspond to and/or provide a mesh network topology of a network, as discussed below at least in relation to FIGS. 4A-5C. In some embodiments, the set of devices can include, but are not limited to, APs, UEs, and the like (e.g., for example, gateway devices, routers, extenders, and the like, or some combination thereof), or some combination thereof.

In some embodiments, the set of devices can be devices that are connected to a network associated with the location, and/or connect to the network at least a threshold amount of times per a threshold amount of time (e.g., connects to the network at least 25 times per month, thereby indicating they live at the location).

According to some embodiments, a location can correspond to, but is not limited to, a home, office, building, and/or any other type of physical location that can be configured to host and/or provide network connectivity to devices in/around the geographic area. Accordingly, in some embodiments, the network, as discussed above, can be any type of communication network (e.g., a location-based or associated network such as Wi-Fi 7 network, for example) that can enable devices to automatically connect upon being within range of the location and/or access point devices providing the network at/around the location.

In some embodiments, Step 302 can further involve the identification of information, which can include, but is not limited to, a type of device, identity (ID) of device, MAC address or IP address of the device, the like, or some combination thereof.

In Step 304, engine 200 can determine connectivity information among the set of devices. That is, according to some embodiments, engine 200 can determine, detect, or otherwise identify the network topology of the devices, and the connection attributes among such devices.

Figure 4B:
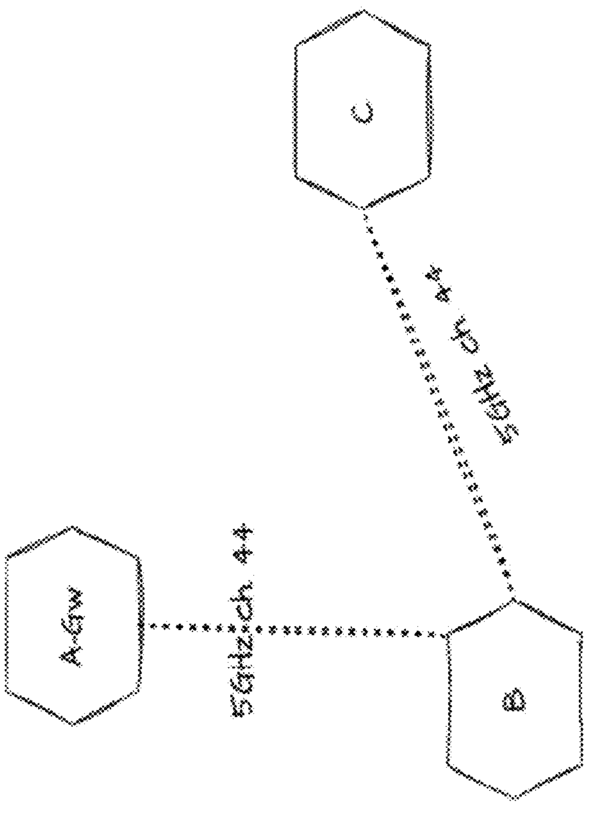
FIGS. 4A-4B depict a non-limiting example network topology according to some embodiments of the present disclosure.
Figure 4A:
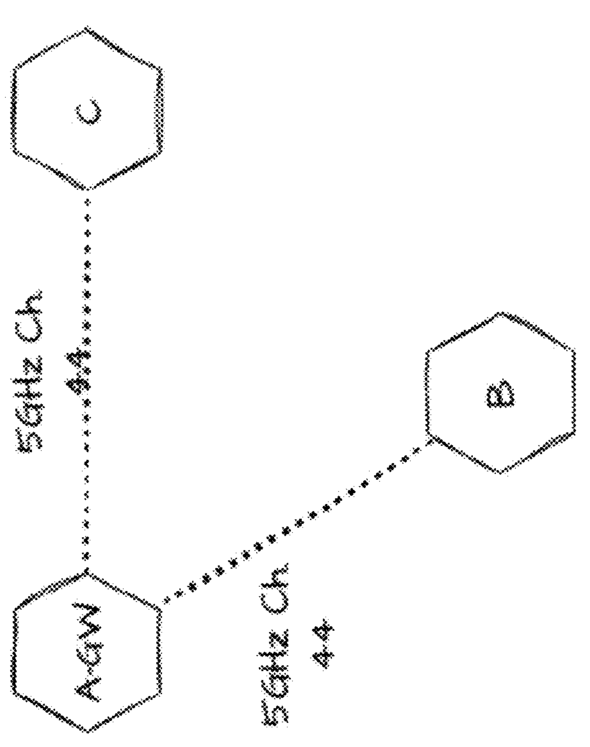

For example, with reference to FIG. 4A, engine 200 can determine that three devices A, B and C are at a location, and that device A is the acting gateway device for the mesh topology. Engine 200 can further determine that the relationship between devices A-C involves a 5 GHZ connection on Channel 44, and devices A-B have the same connection attributes.

As such, according to some embodiments, Step 304 can involve the determination of connection information which can include, but is not limited to, channel, frequency, band, time, frequency, device relationship (e.g., devices A-B and devices A-C, for example) and the like. In some embodiments, the determination of Step 304 can be based on and/or part of the identification of the devices in Step 302.

Continuing with Process 300, in Step 306, engine 200 can function to monitor for and determine, detect or otherwise identify information related to an event that corresponds to a topology change of the mesh network. In some embodiments, as discussed herein, the topology change detection can be based on and/or in accordance with the determined connectivity (from Step 304), such that a request to update such connectivity information causes the detection, for example.

According to some embodiments, a mesh network topology change refers to a modification or reconfiguration of the network's structure and connectivity pattern. In a mesh network, devices are interconnected with multiple paths, allowing data to travel through different routes to reach its destination. When a topology change occurs, the arrangement of such connections is altered, which can occur for various reasons, such as, but not limited to, adding new devices to the network, removing existing devices, repositioning devices to optimize performance or extend coverage, and the like, or some combination thereof. According to some embodiments, such processing can involve updating the routing tables and establishing new links between devices. As discussed herein, such updating can be effectuated via implementation of MLO, which can improve how the network scales and responds to evolving requirements and conditions so as to provide continuous, efficient data transmission and reliable connectivity.

In Step 308, engine 200 can function to activate MLO functionality related to at least one dormant MLO link among the set of devices. As discussed above, since MLO provides the ability to have 2 link layer connections, a mesh topology parent-child connection can always have a 2.4 GHz radio connection established as part of a MLO connection in the back haul (e.g., when the APs are WiFi 7 compliant), and a back-haul and front-haul for the clients that are WiFi 7 compliant. Thus, for example, with reference to FIG. 4A, as discussed above, device relationship A-B and A-C can have 2.4 GHz links established that reside in a dormant state and are not used to transfer any packets. However, whenever there is a mesh topology change (e.g., as detected in Step 306), engine 200 can function to activate such dormant 2.4 GHz links to pass data while the framework breaks the connection on the 5 GHz radios between such devices, as discussed below in more detail. Moreover, as discussed below, the existing connection link can be rendered dormant upon activation of the MLO link, as discussed at least in reference to FIGS. 5A-5C, supra.

In Step 310, engine 200 can establish a new connection among the set of devices within the mesh network topology. According to some embodiments, such new connection (or connections) can be contingent upon, based on, or in response to the topology change detected in Step 306. For example, the new connection can be a new 5 GHZ connection between devices, which can be established while the 2.4 GHZ connection remains intact to ensure the data connection is maintained (e.g., no disruption of service).

And, in Step 312, engine 200 can disconnect the previously MLO connection, which can further involve putting the 2.4 GHz link back in the dormant state. In some embodiments, the disconnection can occur after a predetermined period of time (e.g. 1 minute in the United States, and 10 minutes in the European Union, for example).

Turning to FIGS. 4A-4B, depicted is a non-limiting example embodiment of a star topology between three (3) devices: devices A, B and C. As mentioned above, device A, in this example embodiments, is operating as a gateway AP.

As depicted in FIG. 4A, as discussed above, device A and device B have a network connection on the 5 GHz band on channel 44. In this example, devices A and C have a similar network connection (e.g., 5 GHZ, channel 44).

According to some embodiments, respective to a network topology change (as discussed supra), the star topology can change to a linear topology, as depicted in FIG. 4B. Thus, device A remains connected to device B; however, device C's connection to device A is severed, and a connection to device B is established (e.g., on the 5 GHz band, channel 44, for example).

According to some embodiments, to go from the start topology (of FIG. 4A) to the linear topology (of FIG. 4B), the existing WiFi link on channel 44 between devices A and C has to be broken and a new link has to be formed using the same 5 GHz radio between devices B and C. This breaking and making of the links is unavoidable since the same radio is used for the new connection between devices B and C as was used in the original connection between devices A and C. Thus, the dormant MLO link can be leveraged to ensure device C maintains its network connection and does not suffer a network disruption, as discussed above.

Figure 5A:
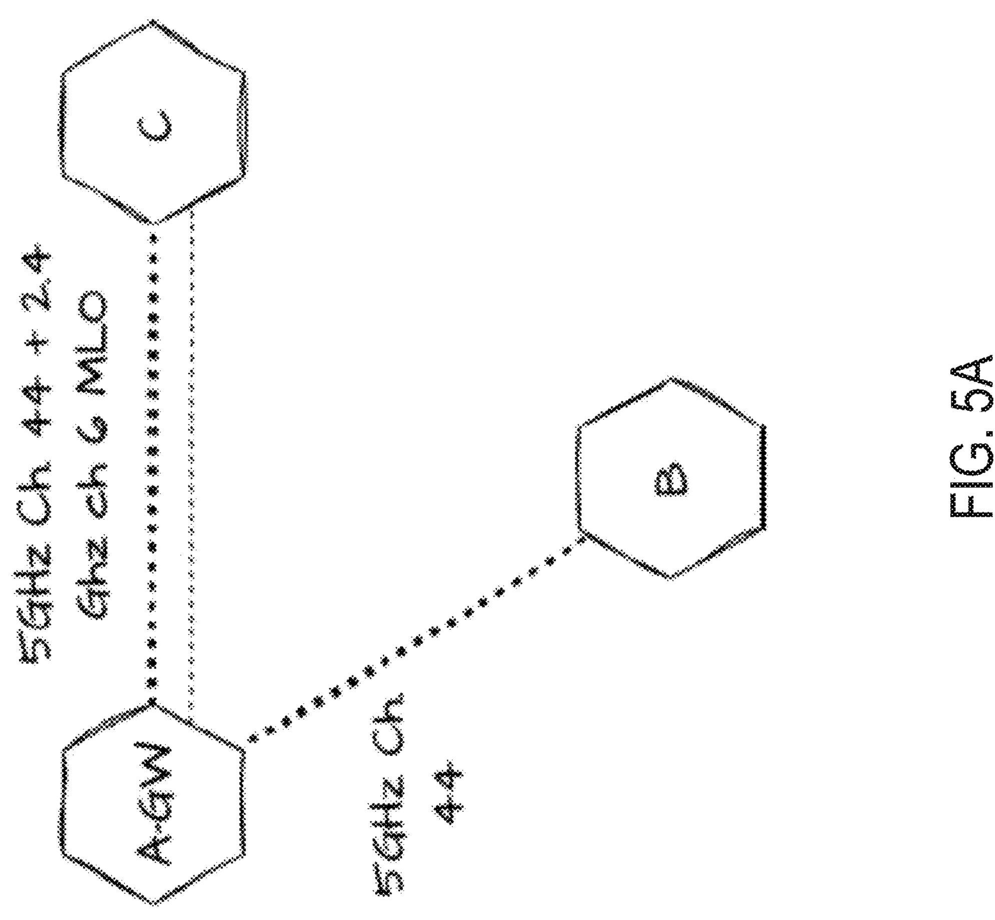
FIGS. 5A-5C depict a non-limiting example network topology according to some embodiments of the present disclosure.
Figure 5C:
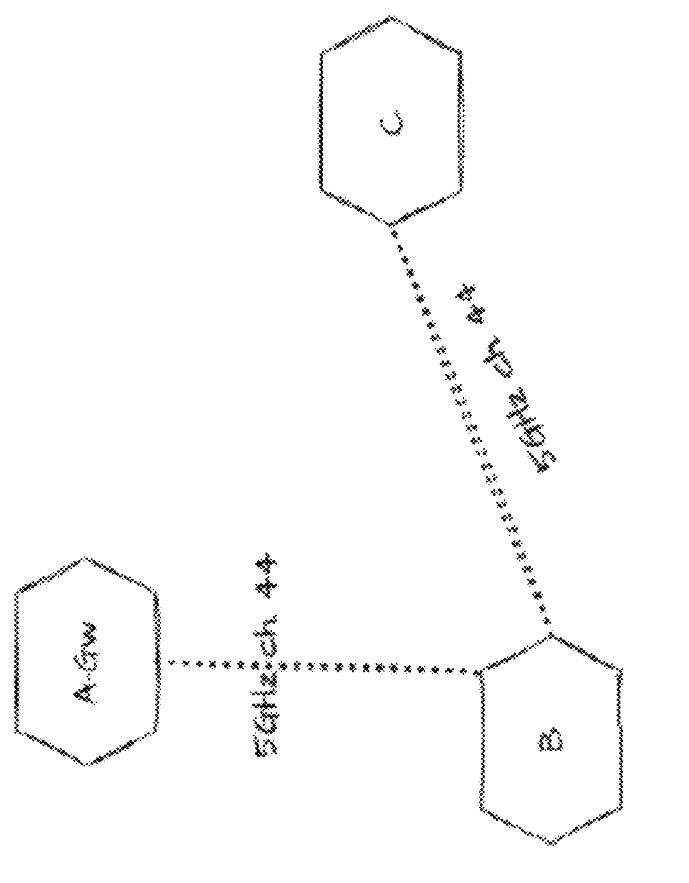
Figure 5B:
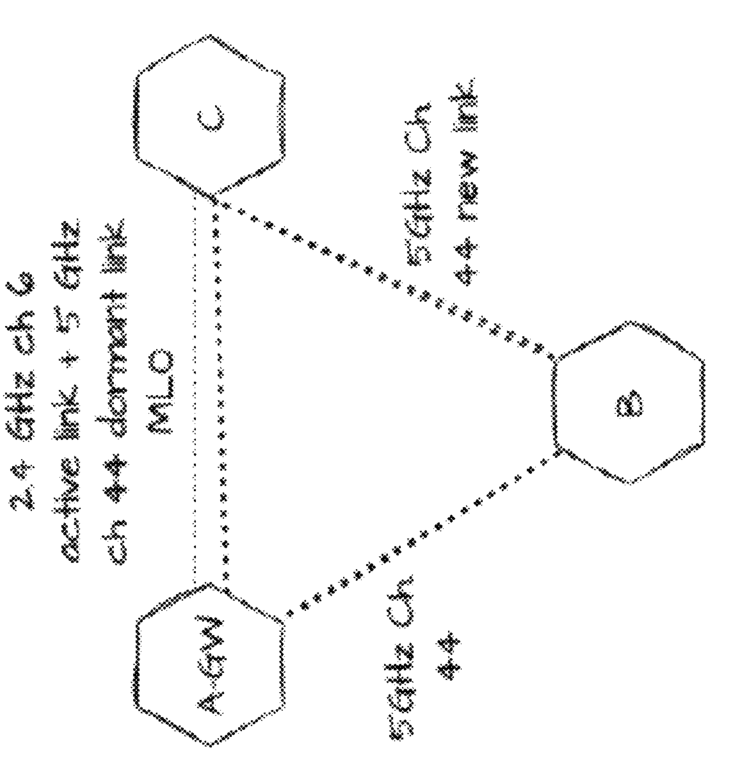

Accordingly, FIGS. 5A-5C provide example embodiments for effectuating the topology transition from FIG. 4A to FIG. 4B.

As depicted in FIG. 5A, device A (acting as the gateway AP) is connected to devices B and C via the 5 GHz band, channel 44, as discussed above in FIG. 4A. As further depicted, as discussed above with reference to Process 300, the connection between devices A-C can have MLO activated, with a 2.4 GHz dormant link.

Thus, as depicted in FIG. 5B, the dormant link can be activated, as discussed above at least in relation to Step 308. According to some embodiments, FIG. 5B provides an intermediate state (e.g., between FIG. 4A and FIG. 4B), where the 2.4 GHz link between device A and C can be used for data traffic between such devices, and the 5 GHZ, channel 44 link is changed to a dormant status. As such, the 5 GHz radio can be used to form a new link between devices C and B; and, while such new link is being formed, the 2.4 GHz link that has been activated and part of the MLO link between devices A and C, can keep the data traffic from C (and its clients) flowing without disruption.

According, as discussed above at least in relation to Steps 310-312, once the new link between devices C and B is formed via 5 GHz radio channel 44, the data traffic from C towards A can be redirected via device B, so the new flow of data from C will be C→B→A for Uplink to the internet and A→B→C for downlink from the internet. Accordingly, as depicted in FIG. 5C, after the transfer of the data path, the old MLO connection between A and C (including the 2.4 GHz link and 5 GHz link) is disconnected.

According to some embodiments, it should be understood that the considerations discussed for the back haul links between the Aps (e.g., with reference to FIGS. 4A-5C) can also be utilized for front haul links between the Aps and the devices that are connected thereto. For example, 2.4 GHz links (which is part of the MLO connection) on the front haul can be utilized in a similar manner as the intermediate link to provide data transfer without disruption between the clients and their AP, which one of skill in the art would understand falls within the scope of the instant disclosure.

Figure 8:
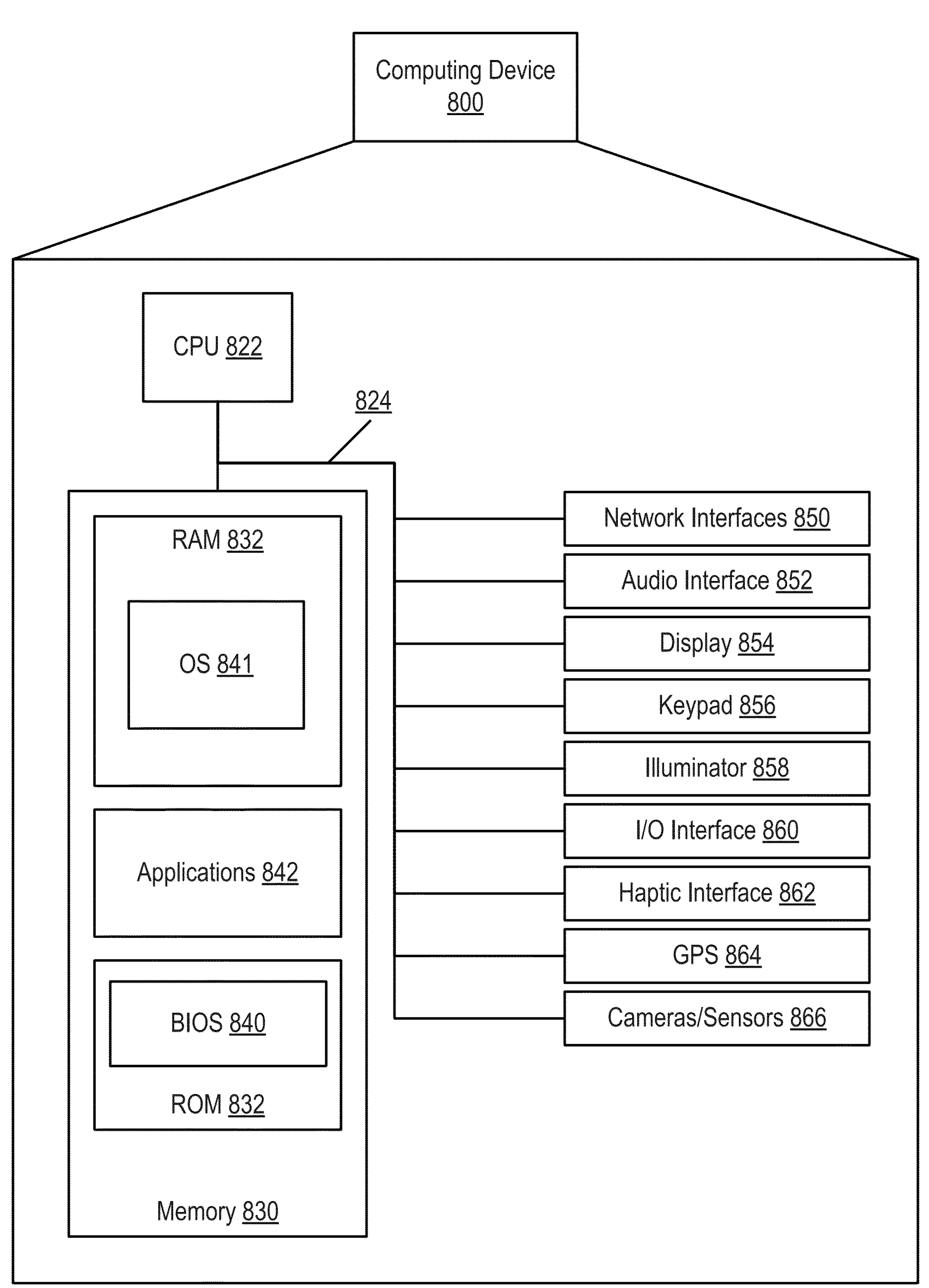
FIG. 8 is a block diagram illustrating a computing device showing an example of a client or server device used in various embodiments of the present disclosure.

FIG. 8 is a schematic diagram illustrating a client device showing an example embodiment of a client device that may be used within the present disclosure. Client device 800 may include many more or less components than those shown in FIG. 8. However, the components shown are sufficient to disclose an illustrative embodiment for implementing the present disclosure. Client device 800 may represent, for example, UE 102 discussed above at least in relation to FIG. 1.

As shown in the figure, in some embodiments, Client device 800 includes a processing unit (CPU) 822 in communication with a mass memory 830 via a bus 824. Client device 800 also includes a power supply 826, one or more network interfaces 850, an audio interface 852, a display 854, a keypad 856, an illuminator 858, an input/output interface 860, a haptic interface 862, an optional global positioning systems (GPS) receiver 864 and a camera(s) or other optical, thermal or electromagnetic sensors 866. Device 800 can include one camera/sensor 866, or a plurality of cameras/sensors 866, as understood by those of skill in the art. Power supply 826 provides power to Client device 800.

According to some embodiments, it should be understood that while the discussion herein focuses on star and linear network topologies, it should be understood that any type of mesh network topology, inclusive of full and partial mesh topologies can be utilized without departing from the scope of the instant disclosure. For example, the disclosed framework can operate to transition among topologies including, but not limited to, star, linear, ring, tree, bus, and the like.

Client device 800 may optionally communicate with a base station (not shown), or directly with another computing device. In some embodiments, network interface 850 is sometimes known as a transceiver, transceiving device, or network interface card (NIC).

Audio interface 852 is arranged to produce and receive audio signals such as the sound of a human voice in some embodiments. Display 854 may be a liquid crystal display (LCD), gas plasma, light emitting diode (LED), or any other type of display used with a computing device. Display 854 may also include a touch sensitive screen arranged to receive input from an object such as a stylus or a digit from a human hand.

Keypad 856 may include any input device arranged to receive input from a user. Illuminator 858 may provide a status indication and/or provide light.

Client device 800 also includes input/output interface 860 for communicating with external. Input/output interface 860 can utilize one or more communication technologies, such as USB, infrared, Bluetooth™, or the like in some embodiments. Haptic interface 862 is arranged to provide tactile feedback to a user of the client device.

Optional GPS transceiver 864 can determine the physical coordinates of Client device 800 on the surface of the Earth, which typically outputs a location as latitude and longitude values. GPS transceiver 864 can also employ other geo-positioning mechanisms, including, but not limited to, triangulation, assisted GPS (AGPS), E-OTD, CI, SAI, ETA, BSS or the like, to further determine the physical location of client device 800 on the surface of the Earth. In one embodiment, however, Client device may through other components, provide other information that may be employed to determine a physical location of the device, including for example, a MAC address, Internet Protocol (IP) address, or the like.

Mass memory 830 includes a RAM 832, a ROM 834, and other storage means. Mass memory 830 illustrates another example of computer storage media for storage of information such as computer readable instructions, data structures, program modules or other data. Mass memory 830 stores a basic input/output system ("BIOS") 840 for controlling low-level operation of Client device 800. The mass memory also stores an operating system 841 for controlling the operation of Client device 800.

Memory 830 further includes one or more data stores, which can be utilized by Client device 800 to store, among other things, applications 842 and/or other information or data. For example, data stores may be employed to store information that describes various capabilities of Client device 800. The information may then be provided to another device based on any of a variety of events, including being sent as part of a header (e.g., index file of the HLS stream) during a communication, sent upon request, or the like. At least a portion of the capability information may also be stored on a disk drive or other storage medium (not shown) within Client device 800.

Applications 842 may include computer executable instructions which, when executed by Client device 800, transmit, receive, and/or otherwise process audio, video, images, and enable telecommunication with a server and/or another user of another client device. Applications 842 may further include a client that is configured to send, to receive, and/or to otherwise process gaming, goods/services and/or other forms of data, messages and content hosted and provided by the platform associated with engine 200 and its affiliates.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, and the like).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, API, instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, and the like).

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data. Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:

identifying a set of devices on a network, the set of devices comprising a first network topology corresponding to a relationship connection between each of the set of devices;

detecting information corresponding to a change of the first network topology;

identifying a network connection between a pair of devices within the set of devices, the identified network connection corresponding to the detected information;

activating, via multi-link operation (MLO) of the network, a dormant link between the pair of devices, the activated dormant link enabling data transmission to remain continuous between the pair of devices;

determining a new pair of devices corresponding to the identified network connection; and establishing a new network connection within the network for the new pair of devices, wherein the dormant link is rendered dormant again upon the establishment of the new network connection.

2. The method of claim 1, wherein the rendering of the link dormant occurs according to a predetermined threshold of time.

3. The method of claim 1, further comprising:

disconnecting the network connection for the pair of devices upon the establishment of the new network connection.

4. The method of claim 1, wherein the change in the first network topology corresponds to a second network topology, the second network topology comprising a different relationship connection between each of the set of devices, wherein the new pair of devices adheres to the different relationship connection.

5. The method of claim 1, further comprising:

determining connectivity information among the set of devices, wherein the identification of the set of devices further comprises determination of the connectivity information.

6. The method of claim 5, wherein the connectivity information comprises information related to channel, frequency, band, time, frequency and device relationship among the set of devices.

7. The method of claim 1, wherein the detected change corresponds to at least one of a change in a frequency band or radio in a front haul or back haul of the network, and change in parent-child relationship among the set of devices.

8. The method of claim 1, wherein the network is a location-specific network, wherein the network is a WiFi mesh network, wherein the WiFi mesh network comprises front haul and back haul components between nodes of the network, wherein the front haul and back haul components comprise the MLO components.

9. The method of claim 1, wherein the set of devices comprise at least one of a user device an access point device for a location.

10. A device comprising:

a processor configured to:

identify a set of devices on a network, the set of devices comprising a first network topology corresponding to a relationship connection between each of the set of devices;

detect information corresponding to a change of the first network topology;

identify a network connection between a pair of devices within the set of devices, the identified network connection corresponding to the detected information;

activate, via multi-link operation (MLO) of the network, a dormant link between the pair of devices, the activated dormant link enabling data transmission to remain continuous between the pair of devices;

determine a new pair of devices corresponding to the identified network connection; and establish a new network connection within the network for the new pair of devices, wherein the dormant link is rendered dormant again upon the establishment of the new network connection.

11. The device of claim 10, wherein the rendering of the link dormant occurs according to a predetermined threshold of time.

12. The device of claim 10, wherein the processor is further configured to:

disconnect the network connection for the pair of devices upon the establishment of the new network connection.

13. The device of claim 10, wherein the change in the first network topology corresponds to a second network topology, the second network topology comprising a different relationship connection between each of the set of devices, wherein the new pair of devices adheres to the different relationship connection.

14. The device of claim 10, wherein the processor is further configured to:

determine connectivity information among the set of devices, wherein the identification of the set of devices further comprises determination of the connectivity information, wherein the connectivity information comprises information related to channel, frequency, band, time, frequency and device relationship among the set of devices.

15. A non-transitory computer-readable storage medium tangibly encoded with computer-executable instructions that when executed by a device, perform a method comprising:

identifying a set of devices on a network, the set of devices comprising a first network topology corresponding to a relationship connection between each of the set of devices;

detecting information corresponding to a change of the first network topology;

identifying a network connection between a pair of devices within the set of devices, the identified network connection corresponding to the detected information;

activating, via multi-link operation (MLO) of the network, a dormant link between the pair of devices, the activated dormant link enabling data transmission to remain continuous between the pair of devices;

determining a new pair of devices corresponding to the identified network connection; and establishing a new network connection within the network for the new pair of devices, wherein the dormant link is rendered dormant again upon the establishment of the new network connection.

16. The non-transitory computer-readable storage medium of claim 15, wherein the rendering of the link dormant occurs according to a predetermined threshold of time.

17. The non-transitory computer-readable storage medium of claim 15, further comprising:

disconnecting the network connection for the pair of devices upon the establishment of the new network connection.

18. The non-transitory computer-readable storage medium of claim 15, wherein the change in the first network topology corresponds to a second network topology, the second network topology comprising a different relationship connection between each of the set of devices, wherein the new pair of devices adheres to the different relationship connection.

19. The non-transitory computer-readable storage medium of claim 15, further comprising:

determining connectivity information among the set of devices, wherein the identification of the set of devices further comprises determination of the connectivity information, wherein the connectivity information comprises information related to channel, frequency, band, time, frequency and device relationship among the set of devices.

* * * * *